United States Patent [19]
Resnick

[11] 3,865,845
[45] Feb. 11, 1975

[54] FLUORINATED DIOXOLES
[76] Inventor: Paul Raphael Resnick, 2206 Fairfield Pl., Wilmington, Del. 19805
[22] Filed: Aug. 1, 1973
[21] Appl. No.: 384,498

Related U.S. Application Data
[63] Continuation-in-part of Ser. No. 118,559, Feb. 24, 1971, abandoned.

[52] U.S. Cl............................ 260/340.9, 260/88.3 A
[51] Int. Cl............................................. C07d 13/08
[58] Field of Search.................................. 260/340.9

[56] References Cited
UNITED STATES PATENTS
3,641,057   2/1972   Scharf et al...................... 260/340.2

OTHER PUBLICATIONS
Fieser et al., Reagents for Organic Synthesis, (1967), pp. 630–631.
Jerry March, Advanced Organic Chemistry: Reactions, Mechanisms, and Structure (1968), pp. 770–771.

*Primary Examiner*—Norma S. Milestone

[57] ABSTRACT

Fluorinated dioxole compounds and the process of preparation are disclosed which compounds are of the formula

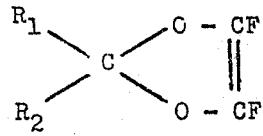

wherein $R_1$ and $R_2$ are both perhalogenated hydrocarbon radicals of 1 to 3 carbon atoms containing at least one fluorine atom. The compounds may be homopolymerized and copolymerized for casting into films or yielding molded articles.

4 Claims, No Drawings

FLUORINATED DIOXOLES

RELATED APPLICATION

The present application is a continuation-in-part of copending Pat. application Ser. No. 118,559, filed Feb. 24, 1971 and abandoned.

The present invention relates to a new class of dioxole compounds. More particularly, the present invention is directed to a novel class of fluorinated dioxole compounds and a process for their preparation.

According to the present invention there is provided a new class of fluorinated dioxole compounds of the general formula:

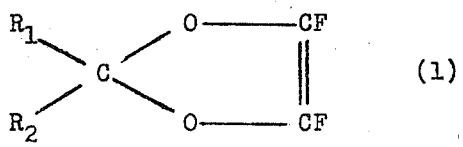
(1)

wherein $R_1$ and $R_2$ are the same or different each having one to three carbon atoms which are perhalosubstituted and contain at least one fluorine atom.

Preferably, both $R_1$ and $R_2$ are identical and fully perfluorinated. However, it is within the scope of this disclosure that in the perhalosubstitution a halogen such as chlorine be employed in addition to fluorine. An illustrative example is when both $R_1$ and $R_2$ denote $CF_2Cl$. An illustrative example with $R_1$ and $R_2$ differing is $R_1$ denoting $CF_2Cl$ and $R_2$ denoting $CF_3$.

Perhalosubstituted and perfluorinated are employed in their normal definition and denote the substitution on the carbon atom(s) is limited respectively to halogen and fluorine.

A most preferred embodiment of the fluorinated dioxole compounds of the invention is perfluoro-2,2-dimethyl-1,3-dioxole of the formula

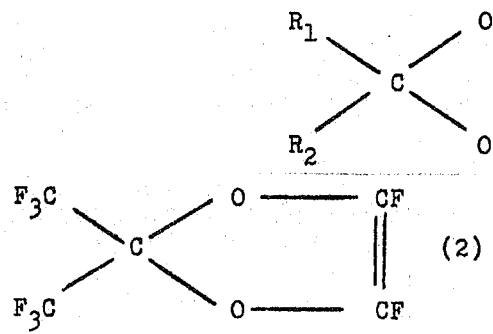
(2)

According to the present invention there is also provided a process for preparing the novel class of compounds of formula (1) above which comprises dehalogenating a fluorinated dioxolane of the general formula

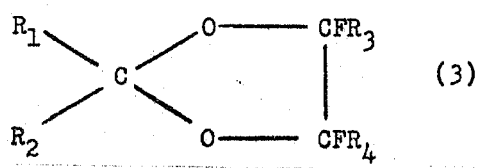
(3)

wherein $R_1$ and $R_2$ are as above defined and $R_3$ and $R_4$ are halogen other than fluorine, in an organic solvent in the presence of magnesium.

The novel fluorinated dioxole compounds of the invention are clear, colorless liquids. Also, the perfluoro-2,2-dimethyl-1,3-dioxole of the invention has a boiling point of about 33°C.

A surprising and unexpected property of the novel class of compounds of the invention is that they may be homopolymerized or copolymerized. The homopolymerization or copolymerization may be undertaken with standard techniques well known in the art. Additionally, perfluoro-2,2-dimethyl-1,3-dioxole homopolymerizes on standing after 2 to 5 days duration. From the copolymerization, conventional monomers well known in the art may be employed. Illustratively, the monomers disclosed in U.S. Pat. No. 2,468,664 are suitable in forming the copolymer. Highly desirable comonomers include chlorotrifluoroethylene, vinylidene fluoride and and hexafluoropropene.

The homopolymers and copolymers may be cast into films or molded by conventional techniques.

The process for preparing the above-described fluorinated dioxole compounds of the invention is exemplified herebelow, and in typical practice includes adding a fluorinated dioxolane of formula (3) above to a heated mixture of magnesium in anhydrous tetrahydrofuran. The perfluoro dioxole may be recovered from the resulting mixture by any suitable means such as distillation.

The reaction is highly exothermic and may be conducted at any suitable temperature. Preferably, the reaction mixture is initially heated at a temperature below about 65°C. Also, the reaction may be conducted at any suitable pressure; preferably, the reaction is conducted at atmospheric pressure or at a pressure below atmospheric pressure.

The principle and practice of the present invention will now be illustrated by the following Examples which are only exemplary thereof and it is not intended that the invention be limited thereto since modifications in technique and operation will be apparent to anyone skilled in the art.

The starting dioxolanes for the preparation of

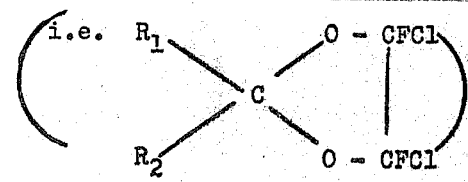

may be prepared following the general methods described in U.S. Pat. No. 2,925,424 and on page 44 of the December 1970 issue of the Product Licensing Index publication.

For example, [$R_1 = CF_3$; $R_2 = CF_2Cl$] reaction of chloropentafluoroacetone with 2-chloroethanol followed by treatment with potassium carbonate yields 2-chlorodifluoromethyl-2-trifluoromethyl-1,3-dioxolane. Chlorination at 50°C. with chlorine and carbon tetrachloride yields 2-chlorodifluoromethyl-2-trifluoromethyl-4,4,5,5-tetrachloro-1,3-dioxolane. Fluorination with $SbF_3/SbCl_5$ at 120° yields 2-chlorodifluoromethyl-2-trifluoromethyl 4,5-dichloro-4,5-difluoro-1,3-dioxolane, the starting dioxolane for the preparation of 2-trifluoromethyl-2-chlorodifluoromethyl-4,5-difluoro-1,3-dioxole. The use of other starting ketones e.g., sym dichlorotetrafluoroacetone, perfluorodiethyl ketone, perfluoromethylethyl ketone yields dioxoles with differing $R_1$ and $R_2$.

More specifically, perfluoro-2,2-dimethyl-4,5-dichloro-1,3-dioxolane utilized in the examples herebelow may be prepared by the method disclosed on page 44 of the December 1970 issue of the Product Licensing Index publication which described that the above-mentioned dioxolane may be obtained fluorinating 2,2-bis(trifluoromethyl)-4,4,5,5-tetrachloro-1,3-dioxolane with $SbF_3$—$SbCl_5$ at 120°C. The 2,2-bis(trifluoromethyl)-4,4,5,5-tetrachloro-1,3-dioxolane may be prepared in accordance with the method described in U.S. Pat. No. 2,925,424.

EXAMPLE 1 — PREPARATION OF PERFLUORO-2,2-DIMETHYL-4,5-DIBROMO-1,3-DIOXOLANE

A 50/50 mixture of perfluoro-2,2-dimethyl-1,3-dioxole and perfluoro-2,2-dimethyl-4,5-dichloro-1,3-dioxolane was cooled in an ice bath while being irradiated with a sun lamp. Bromine was added dropwise and an immediate exothermic reaction took place. Bromine addition was continued until the bromine no longer reacted and the brown color of bromine remained. The reaction mixture was washed with 5% aqueous sodium bisulfite and dried. A gas chromatogram of the crude product showed it to be a 50/50 mixture of perfluoro-2,2-dimethyl-4,5-dichloro-1,3-dioxolane and a higher boiling material. Distillation of the crude product yielded in addition to perfluoro-2,2-dimethyl-4,5-dichloro-1,3-dioxolane, boiling at 86°, a colorless liquid, b.p. 116°. A gas chromatogram of the liquid showed it to be approximately 97 percent pure. The infrared spectrum of the liquid was consistent with the structure, perfluoro-2,2-dimethyl-4,5-dibromo-1,3-dioxolane. The NMR spectrum of another sample prepared by the same procedure was also consistent with this structure.

PREPARATION OF PERFLUORO-2,2-DIMETHYL-1,3-DIOXOLE

A mixture of 15 g. of absolute ethanol, 2.0 g. of zinc dust and 3.5 g. of perfluoro-2,2-dimethyl-4,5-dibromo-1,3-dioxolane was added to a thoroughly dried 50 ml. 3-necked flask fitted with a magnetic stirrer, dropping funnel and small distillation column topped by a Dry Ice cooled trap. The reaction mixture was stirred and heated to give 5 ml. of distillate in addition to material in the Dry Ice cooled trap. The distillate separated into an upper and a lower layer when added to ice water, and the lower layer was recovered and added to the trap material to give 0.62 g. of product. A gas chromatogram of this product showed it to consist of 63 percent of material having a retention time identical to authentic perfluoro-2,2-dimethyl-1,3-dioxole. An infrared spectrum of this 63 percent of the product was identical to that of perfluoro-2,2-dimethyl-1,3-dioxole.

EXAMPLE 2

7.3 Grams of magnesium turnings, 100 ml. of anhydrous tetrahydrofuran and one crystal of iodine was added into a dry and nitrogen flushed 200 ml. capacity round bottom flask having three openings and equipped with a magnetic stirrer, a pressure equalizing dropping funnel, a thermometer and a take-off head with a Dry Ice cooled trap. The mixture was stirred and heated to 60°C. and then a solution of 20 grams of perfluoro-2,2-dimethyl-4,5-dichloro-1,3-dioxolane in 20 mls. of anhydrous tetrahydrofuran was slowly added to the flask. A vigorous reaction took place and 25 mls. of distillate boiling between 33°C. and 65°C. was distilled from the reaction mixture. The distillate was poured into cold water and the mixture separated into two layers. The lower layer was recovered and dried and the resulting product was combined with the material in the Dry Ice cooled trap; 9.1 grams of product was obtained. The latter was distilled using a 2 foot spinning band column, and a center cut having a boiling point of 33°C. was extracted which was perfluoro-2,2-dimethyl-1,3-dioxole of greater than 98 percent purity. The mass spectrum of the product exhibited a strong peak at m/e of 244 which is consistent with that of perfluoro-2,2-dimethyl-1,3-dioxole.

EXAMPLE 3

2.0 Grams of perfluoro-2,2-dimethyl-1,3-dioxole dissolved in 100 ml. of Freon 113, 25 mls. of an 0.001 percent solution of perfluoropropionyl perioxide in Freon 113 and 10 grams of tetrafluoroethylene was added to a stainless steel autoclave of 180 mls. capacity. The mixture was heated at 50°C. for 2 hours. A yield of 2.5 grams of a white, solid polymeric product was obtained. The product exhibited a broad endothermic peak when subjected to Differential Thermal Analysis (using a Du Pont Model 900 DTA apparatus) indicative of a melting point about 265°C. An infrared spectrum scan of the copolymer product showed the presence of a strong band at 10.1 microns due to a perfluoroether group.

EXAMPLE 4

A sample of perfluoro-2,2-dimethyl-1,3-dioxole prepared by the method shown in Example 2 was washed with water and dried with calcium chloride. The sample, 5.0 g., was allowed to stand at room temperature in a Dry Box in a nitrogen atmosphere. It polymerized on standing to give a clear solid which was pressed into a film whose infrared spectrum was consistent with that of polyperfluoro-2,2-dimethyl-1,3-dioxole.

EXAMPLE 5

A 0.8 g. sample of perfluoro-2,2-dimethyl-1,3-dioxole was sealed in a quartz tube and irradiated with 16 RPR-2537A lamps in a Srinivasan-Griffin Photochemical Reactor (Southern New England Ultraviolet Co., Middletown, Conn.) for 64 hours. The product was a yellowish solid whose IR spectrum in Freon C51-12 was consistent with the polyperfluoro-2,2-dimethyl-1,3-dioxole structure.

Although the invention has been described by way of specific embodiments, it is not intended to be limited thereto. As will be apparent to those skilled in the art, numerous embodiments can be made without departing from the spirit of the invention or the scope of the following claims.

What is claimed is:

1. A fluorinated dioxole of the general formula

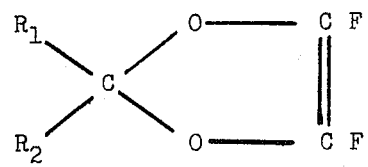

wherein $R_1$ and $R_2$ are the same or different both consisting of one to three carbon atoms which are perhalosubstituted and containing at least one fluorine atom whereby the perhalosubstituents consist of chlorine or fluorine atoms.

2. The fluorinated dioxole of claim 1 wherein both $R_1$ and $R_2$ contain one carbon atom.

3. The fluorinated dioxole of claim 2 wherein $R_1$ and $R_2$ are different.

4. The fluorinated dioxole of claim 2 which is perfluoro-2,2-dimethyl-1,3-dioxole.

* * * * *